July 27, 1954 D. W. NORWOOD 2,684,610
LIGHT METER
Filed Dec. 26, 1950 4 Sheets-Sheet 1
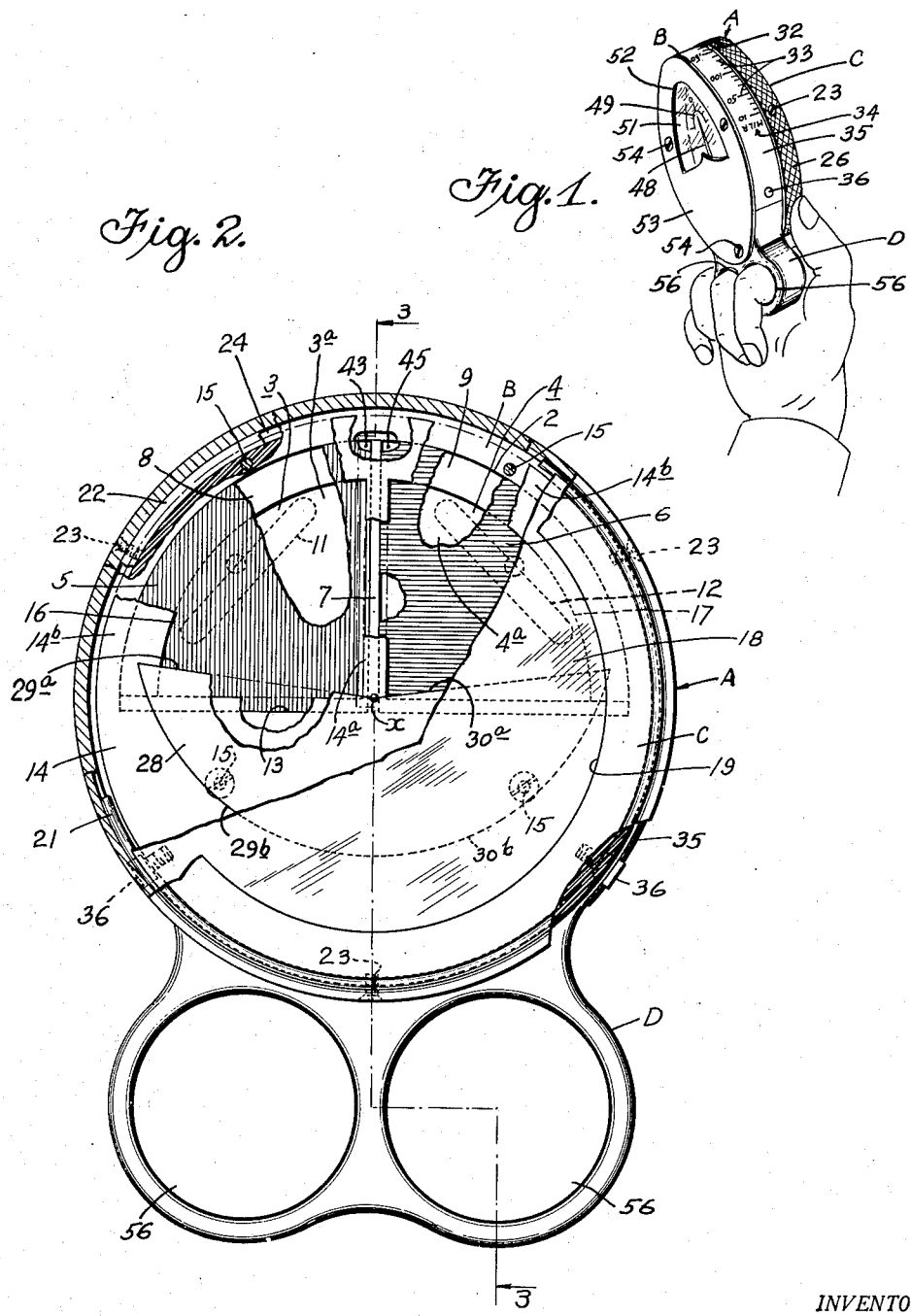
INVENTOR.
Donald W. Norwood.
BY
Knight & Rodgers
ATTORNEYS.

July 27, 1954     D. W. NORWOOD     2,684,610
LIGHT METER

Filed Dec. 26, 1950     4 Sheets-Sheet 2

INVENTOR.
Donald W. Norwood.
BY
ATTORNEYS.

July 27, 1954   D. W. NORWOOD   2,684,610
LIGHT METER
Filed Dec. 26, 1950   4 Sheets-Sheet 3

INVENTOR.
Donald W. Norwood.
BY
Knight & Rodgers
ATTORNEYS.

July 27, 1954  D. W. NORWOOD  2,684,610
LIGHT METER
Filed Dec. 26, 1950  4 Sheets-Sheet 4

INVENTOR.
Donald W. Norwood.
BY
Knight & Rodgers
ATTORNEYS.

Patented July 27, 1954

2,684,610

UNITED STATES PATENT OFFICE 2,684,610

LIGHT METER

Donald W. Norwood, Pasadena, Calif.

Application December 26, 1950, Serial No. 202,711

5 Claims. (Cl. 88—22.5)

This invention relates to light meters, and particularly to light meters of the type comprising two photovoltaic cells and means for transmitting incident light to each cell, and in which measurements of a factor to be determined are obtained by moving an adjustable light obstructing element to a position providing equal illumination of the two cells. The value of the factor to be measured is then indicated by a suitably graduated scale connected to the adjustable light obstructing element.

Meters of this type may be used for measuring the relative color content of light, in connection with color photography or for other purposes, as shown and described for example in my patent applications Ser. No. 55,318, filed October 19, 1948, now abandoned, and Ser. No. 146,061, filed February 24, 1950, now abandoned, in which case color filters having different spectral transmission characteristics are disposed in front of the respective photovoltaic cells. Meters of this type may also be used for comparing the relative intensities of light received from two different sources, in which case suitable means may be provided for transmitting light received from the respective sources to the respective photovoltaic cells.

An important object of the invention is to provide a light meter of this type which may be held and manipulated by one hand of an operator to obtain the desired measurement.

A further object is to provide such a device which may be held and operated by one hand to provide equal illumination of the two cells, while permitting reception of incident light for transmission to the two cells and also permitting the operator to observe the position of an indicating member which indicates when the illumination of the two cells is equal.

Another object is to provide a device having finger grip means adapted to be gripped and firmly held by the fingers of a hand, and operating means positioned for convenient engagement and manipulation by the thumb of the same hand for moving an adjustable light obstructing element to provide equal illumination of the two cells.

A further object is to provide such a device in which the amount of the change in the relative size of adjustable apertures through which light is transmitted to the two photovoltaic cells upon a given amount of movement of the adjustable light obstructing element and the scale means connected thereto is caused to have certain predetermined characteristics within the range of movement of the light obstructing element, in order to provide adequate sensitivity of measurement and advantageous spacing of the graduations of the scale means.

How the above and other objects are attained will be apparent from the following description, with reference to the accompanying drawings, in which:

Fig. 1 is a perspective view of a preferred form of light meter in accordance with my invention, illustrating how the device may be conveniently held and manipulated by one hand of an operator;

Fig. 2 is a partly sectional front elevation of the device shown in Fig. 1, with certain elements partially broken away;

Figure 3:
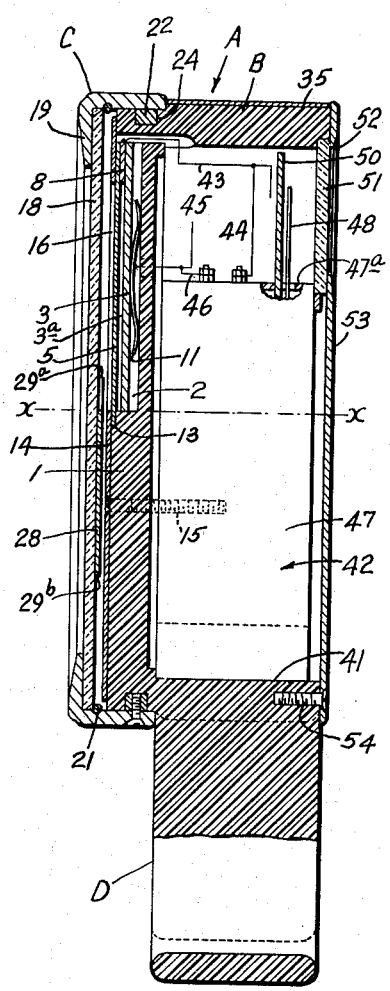
Fig. 3 is a vertical section taken generally on line 3—3 in Fig. 2.

The forms of light meter shown in the drawings and described specifically hereinafter are adapted particularly for use in measuring the relative color content of light incident upon a light receiving surface located at one end of a generally cylindrical housing structure. For convenience, this light receiving end will be referred to herein as the front end of the device. However, the invention is not limited to this particular arrangement of the light receiving surface, and may be embodied in light meters for other purposes.

In the form of device shown in Figs. 1 through 7, the cylindrical housing structure A comprises a main cylindrical housing or casing B and an annular collar C rotatably mounted thereon at the front end. The casing member B is preferably formed of electrically insulating material, such as molded plastic material. The collar C may be formed of either molded plastic or metal.

Formed as an integral part of casing B at the forward end thereof is a transverse wall I, provided with a semicircular recess 2 (Fig. 3) in the upper portion of the casing. Within the recess 2 are mounted two photovoltaic cells 3 and 4 and two color filters 5 and 6, the color filters being positioned in front of the respective cells.

The cells 3 and 4 may be any suitable type of photovoltaic cells having forward light receiving surfaces and adapted to generate an electric current in response to light received on such surfaces. Examples of such cells are the selenium cell and the copper oxide cell, which are generally referred to as barrier layer photocells. I prefer to use cells of the barrier layer type, in which the electric current is generated at a high resistance surface of contact between different materials. Such cells are also provided with front and back electrodes for connection to an electric circuit. The current generated thereby varies with the total illumination falling upon the forward light receiving surface. For light in different portions of the spectrum, the energization of the cell is also dependent upon its spectral response characteristics, and this must be taken into account in designing the device.

Figure 4:
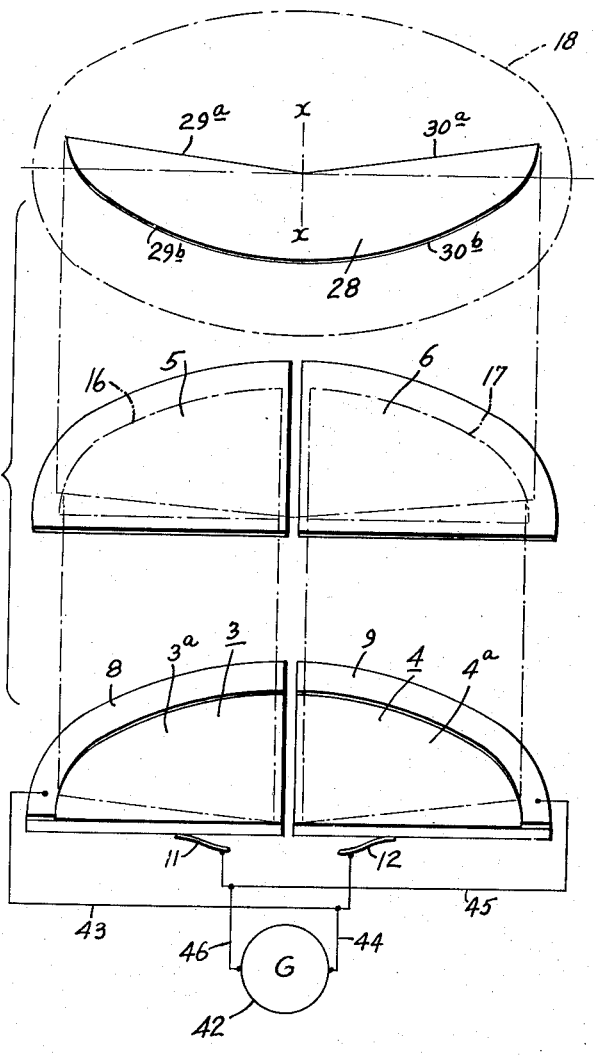
Fig. 4 is a schematic exploded perspective view of the photovoltaic cells and light control means in this form of device, with an electric circuit shown schematically.
Figure 5:
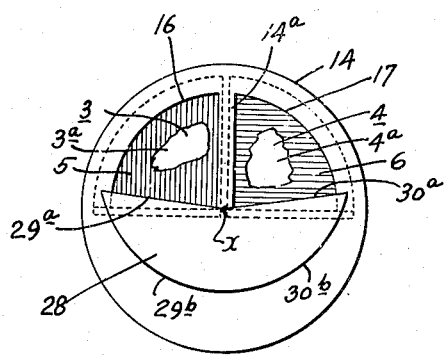
Figs. 5, 6 and 7 are schematic front elevations of certain elements of the device, showing the adjustable light obstructing means in different positions.

The cells 3 and 4 are each of quadrantal shape and are located side by side within the recess 2 with their adjacent radial edges in close proximity to each other and their respective forward light receiving surfaces 3a and 4a lying substantially in a common plane, said surfaces being preferably of equal areas as shown particularly in Fig. 4. In Figs. 2 and 5, the color filters are partly broken away so as to show portions of the light receiving surfaces of the cells. The casing wall 1 is provided with a rib 7 (Fig. 2) which projects forwardly within recess 2 between the cells 3 and 4 and between color filters 5 and 6, to insulate the cells from each other and assist in holding said cells and color filters in position in said recess, and also limit the reception of light by each cell to light transmitted by its associated color filter. Front contact members 8 and 9 are provided at the peripheral portions of the cells 3 and 4 in electrical contact with the front electrodes thereof. Back contact members 11 and 12 are also provided, in electrical contact with the back electrodes of the respective cells, and are shown as leaf springs in resilient engagement with wall 1 and the rear faces of the cells to insure good contact and to assist in holding the cells in position.

The color filters 5 and 6 are also of generally quadrantal shape and extend over and in front of the light receiving surfaces 3a and 4a of the respective cells. The peripheral portions of the color filters are shown as extending over the front contact members 8 and 9. The adjacent radial edges thereof abut closely against the intervening rib 7, and the remaining radial edge portions thereof are received in recesses 13 in wall 1. The filters 5 and 6, which may be similar to those ordinarily employed in color photography, are adapted to transmit to the light-receiving surfaces of the respective cells light in two different, preferably widely separated, portions of the spectrum, while substantially obstructing passage of light of colors outside the respective spectral portions or components so transmitted. As a specific example, the filter 5 may be one that transmits primarily light in the "red" portion of the spectrum, and the filter 6 may be one that transmits primarily light in the "blue" portion of the spectrum. For convenience, these filters will be referred to hereinafter as "red" and "blue" filters, respectively, but it is to be understood that this does not imply that the invention is limited to the use of filters of these particular color transmitting characteristics. It will be seen that the color filters 5 and 6 serve to restrict the reception of light by the light-receiving surfaces of the respective cells 3 and 4 to the components of light transmitted by the respective filters.

The photovoltaic cells and color filters are held in position by a thin retaining plate 14 secured to casing member B as by screws 15 and engaging the color filters 5 and 6, which serve to insulate said plate from the cells. Plate 14 has two quadrantal openings 16 and 17 of substantially the same size, shape and position as the light receiving surfaces of the respective cells, for transmitting light thereto. A radially extending portion 14a of plate 14 engages rib 7 and projects slightly over the adjacent edge portions of color filters 5 and 6, and peripheral portions 14b thereof overlie the peripheral edge portions of the color filters and the front contact members 8 and 9 of the photovoltaic cells.

At the front end of the housing structure A is a light collecting and diffusing element 18 of flash opal glass or other translucent light diffusing material, through which light incident on the front surface thereof is transmitted and diffused inwardly through the color filters 5 and 6 to the respective photovoltaic cells 3 and 4. The element 18 is shown as circular in shape, and may be held in position within an inwardly projecting annular flange 19 on rotatable collar C by means of a split resilient ring 21 engaged in an annular groove in said collar. The inner edge of flange 19 is located outwardly of the peripheral edges of the quadrantal openings 16 and 17 in the plate 14 so that said collar does not interfere with the reception and transmission of light by element 18 to the entire exposed areas of the light receiving surfaces 3a and 4a of the photovoltaic cells. The element 18 is secured to collar C for rotation therewith, and may, if desired, be cemented or otherwise tightly secured thereto to prevent accidental rotative displacement of element 18 relative to the collar C.

The collar C is rotatably mounted on casing B by means of a split resilient mounting ring 22 removably secured to said collar as by screws 23 and rotatably disposed in annular groove 24 in casing B. The peripheral surface of collar C is preferably provided with surface irregularities or projections as indicated at 26 in Fig. 1 to facilitate rotation thereof by the thumb as described hereinafter.

Secured to the rear or inner face of the light collecting and diffusing element 18 is an adjustable light-obstructing element in the form of an opaque mask 28. Said mask may, for example, comprise a thin sheet of metal or other opaque material cemented or otherwise secured to element 18, or may be formed by applying an opaque layer of paint or other coating to the inner surface of element 18. The mask 28 is in any case firmly secured to element 18 for rotation with said element, by manual rotation of collar C, about the central axis of the cylindrical housing structure A, said axis being indicated at X in Figs. 2, 5, 6 and 7 and by dot-dash lines X—X in Figs. 3 and 4.

In Figs. 2 through 5 the mask 28 is shown in an intermediate position and lies principally within the lower half of the housing structure A, so as to equally expose the light receiving surfaces 3a and 4a of both cells to reception of light transmitted inwardly by the element 18 through the respective color filters. The mask may be described as generally semi-circular in shape, but is modified somewhat from a true semi-circle in order to provide an advantageous rate of change in the relative size of the light admitting apertures for the two cells as the mask is rotated in either direction from its intermediate position.

Referring to Figs. 2, 4 and 5, it will be seen that the upper edge of the mask 28 is inclined upwardly at a slight angle to the horizontal, for example at an angle of approximately 5° to 10°, from the axis X in each direction outward to positions beyond the peripheral edges of the respective light transmitting openings 16 and 17 in plate 14, to provide two inclined leading edges 29a and 30a. Thus, when the mask is in this intermediate position, the mask cuts off a small sector of each of the apertures through which light is transmitted to the light-receiving surfaces 3a and 4a of the respective cells. If the mask is rotated in either direction from its intermediate position, one of the leading edges will move upwardly to decrease the size of one of said light transmitting apertures while the other leading edge will move downward to increase the size of the other aperture until it reaches the horizontal radial edge of the corresponding quadrantal opening in plate 14. For example, rotation of the mask in a clockwise direction from the position shown in Fig. 5 to that shown in Fig. 6 will decrease the size of the light admitting aperture for the "red" cell 3 and increase the size of the light admitting aperture for the "blue" cell 4.

In this position, the light admitting aperture for cell 4 has been increased to its maximum size as determined by the quadrantal opening 17 in plate 14. Further rotation in the same direction will decrease the size of the light admitting aperture for cell 3 while the light admitting aperture for cell 4 remains constant. It will be seen, however, that the lower edge of the mask is not formed as a semi-circular arc about the axis X but is formed to provide two trailing edge portions 29b and 30b which are curved inwardly from such an arc, so that the radial distance thereof from the axis X decreases progressively from the opposite sides of the mask toward the middle of the lower edge. Due to this configuration, as the mask is rotated further in the same clockwise direction from the position shown in Fig. 6, the trailing edge portion 29b will move across the quadrantal opening 16 in plate 14 so as to open up a supplemental aperture of progressively increasing size rearwardly of the trailing edges 29b as the leading edge 29a moves to decrease the aperture at the leading side of the mask. Thus, although further clockwise rotation of the mask, to positions such as illustrated in Fig. 7, will progressively decrease the total effective light admitting aperture for cell 3, the net decrease in such effective aperture resulting from successive equal increments of angular movement of the mask becomes progressively less.

The rotatable collar member C is manually operable to rotate the adjustable light obstructing mask 28 relative to the casing member B and the photovoltaic cells and color filters mounted therein. One of said members B or C is provided with a scale indicating different values of color content of light, and the other of said members is provided with an index or reference mark positioned to register with the graduations of said scale. For example, as shown in Fig. 1, the operating member or collar C may be provided with an index mark 32 positioned to register with spaced graduations 33 of a scale 34 on casing member B. The scale graduations 33 may, if desired, be applied directly to the peripheral surface of casing B as by printing or engraving them thereon. However, in order to provide for use of different scales if desired, I prefer to apply the scale graduations to a separate scale member such as an elongated flexible strip 35 removably secured to casing B as by mounting members 36 on said casing engaging the strip adjacent the ends thereof.

The scale 34 is graduated to represent different values of a factor dependent upon or indicative of the relative color content of light. For example, it may be graduated to provide indications of the color temperature of the light, according to any desired system of measurement. According to one well-known system, the color temperature may be expressed in degrees Kelvin (° K.), which is the temperature at which a black body will radiate light of the same color. According to another system, the color temperature may be expressed in "mireds." This term signifies "microreciporcal degrees," the color temperature in "mireds" being equal to the reciprocal of one-millionth of the color temperature in ° K. As another example, for use in color photography, the scale may be graduated so as to give a direct indication of the appropriate color filter to use over the lens of the camera, for any combination of color of illumination and type of color film. As a specific example, the scale graduations 33 may represent different values of color temperature as expressed in "mireds," and may cover a range of color temperatures ranging from 10 to 400 mireds.

The casing B is recessed inward from its rear end to provide a compartment 41 (Fig. 3) in which is mounted an electrical indicating instrument such as a galvanometer 42 for indicating when the two photovoltaic cells 3 and 4 are equally energized. Any suitable type of circuit may be provided connecting the cells to the galvanometer in such manner as to indicate when the energization of the two cells is equal and when either cell is energized more than the other cell.

For example, in the circuit shown diagrammatically in Fig. 4, the opposite terminals or electrodes of the two cells are connected together to provide a series circuit through the two cells, and the galvanometer 42 is connected to this circuit in shunt relation to each cell. Thus, the front contact member 8 of cell 3 and the back contact member 12 of cell 4 are connected together by wire 43, which is connected by wire 44 to one terminal of the galvanometer. Similarly, the front contact member 9 of cell 4 and the back contact member 11 of cell 3 are connected together by a wire 45, which is connected by wire 46 to the other terminal of the galvanometer. The case 47 of the galvanometer 42 is secured in position within the casing B, as by means of two of the above mentioned screws 15. The upper portion of the galvanometer case 47 is broken away as indicated at 47a (Fig. 3), so that the pointer 48 and a scale 49 (Fig. 1) on the rear face of the scale member 50 of the galvanometer are exposed for observation through a transparent window 51 and a viewing opening 52 in a plate 53 which closes the rear end of compartment 41 and is removably secured to casing B as by screws 54.

When the total illumination falling on the light receiving surfaces of the two cells is equal, the two cells will generate equal currents and will have equal internal resistances, so that the current will flow entirely through the two cells in series. The two terminals of the galvanometer 42 will therefore be at the same potential, and the pointer 48 will give a zero reading on scale 49. If the total illumination of one cell is less than that of the other cell, the internal resistance of the less illuminated cell will increase and the current generated thereby will decrease, so that the current generated by the other cell will flow partially through the galvanometer, creating a potential difference in one direction across the galvanometer and causing the pointer 48 to be deflected to one side or the other of its zero position according to which cell is less energized than the other.

The device further comprises finger grip means D secured to casing B and extending downward therefrom rearwardly of the collar C. Said finger grip means is preferably formed integrally with casing B, and is shown as provided with two laterally spaced finger receiving openings in the form of holes 56 extending therethrough in a direction from front to rear, preferably substantially parallel to the axis of the housing structure A. The holes 56 are preferably located symmetrically at opposite sides of a vertical center line through the housing structure. They are of suitable size and shape to permit two fingers of one hand of a user to be inserted through the respective holes to positions in which these fingers may firmly grip and hold the finger grip means D to support the device steadily in a desired position in front of the user for manipulation and observation of the device. I have found that finger holes of generally cylindrical shape, preferably with somewhat beveled or rounded surface portions at the ends thereof as shown in Fig. 3, are quite satisfactory for this purpose.

One method of holding the device during use is illustrated in Fig. 1, in which the first and second fingers of the right hand are inserted through holes 56 from the forward ends thereof so as to project rearwardly through the holes. The projecting portions of the fingers may then be bent downward to provide a firm hold on the finger grip means D. The device may then be held in a suitable position in front of the user, with the light collector and diffuser 18 at the forward end of the housing structure A directed away from the user and toward the source or sources of incident light whose relative color content is to be measured. When held in this position, a portion of the periphery of collar C at the lower right side thereof is disposed adjacent and somewhat above and forwardly of the finger grip means D in position to be easily engaged by the thumb of the same hand, as indicated in Fig. 1, to effect rotation of said collar in either direction by moving the thumb upward or downward, and the rear end of the housing structure A is directed toward the user's eyes so that he can readily observe the galvanometer scale 49 and the position of pointer 48. The device may of course be held and manipulated in the same manner by the fingers and thumb of either hand. If the finger grip means is held in the same manner in the left hand, the operative engagement of the thumb with the collar C would occur at the lower left side thereof.

The light incident upon the translucent light collector and diffuser 18 is transmitted inwardly through the adjustable light admitting apertures defined by the edges of the adjustable mask 28 in conjunction with the quadrantal openings 16 and 17 in the fixed plate 14, and through the respective color filters 5 and 6 to the respective cells 3 and 4. The light receiving surface of cell 3 is illuminated only by light passing through the "red" filter 5, and the light receiving surface of cell 4 is illuminated only by light passing through the "blue" filter 6. The relative illumination and energization of the cells is therefore dependent upon the relative color content of the incident light in the two portions of the spectrum transmitted by the respective color filters and upon the relative sizes of the above mentioned adjustable apertures through which light is transmitted to the respective cells. The relative sizes of these two adjustable apertures are varied by rotation of the adjustable light obstructing mask 28. When said mask is in the intermediate position shown in Figs. 2, 4 and 5, these two light admitting apertures are of equal size.

The two color filters 5 and 6 may be so selected in relation to the spectral response characteristics of the photovoltaic cells 3 and 4 that, when the light obstructing mask 28 is in the intermediate position shown in Figs. 2, 4 and 5 and the device is subjected to incident light having a color temperature of some intermediate value such as 170 mireds, the quantities of light passing through the two filters and falling upon the light receiving surfaces of the two cells will be equal so as to cause equal energization thereof. For example, I have found that when using a certain well-known type of photovoltaic cells of the barrier layer type, the red filter 5 may be a Wratten #23A filter and the blue filter 6 may be a Wratten #43 filter. Under the above conditions of equal illumination and energization of the two cells when the device is subjected to incident light having a color temperature of 170 mireds and with the mask 28 adjusted to the intermediate position, the current will flow entirely through the two cells so that the galvanometer 42 will give a zero reading. The mired scale 34 is so located that the index mark 32 will register with the 170 mired scale graduation when the mask 28 is in this intermediate position, so that the reading on the scale 34 will correctly indicate the color temperature of the incident light.

If the device with the mask in this intermediate position is subjected to incident light having a preponderance of red light, with a color temperature below that represented by 170 mireds, the quantity of light transmitted by the red filter 5 and falling upon the light receiving surface of cell 3 will be greater than that transmitted by the blue filter 6 and falling upon the cell 4. Consequently, the galvanometer pointer 48 will be deflected in one direction, for example, toward the right as viewed by the user in Fig. 1, indicating preponderance of red in the incident light. The rotatable collar C is therefore manipulated by engagement of the thumb therewith as described above so as to rotate the mask 28 in a clockwise direction as viewed in Fig. 2 (corresponding to counter-clockwise rotation of the collar C as viewed by the user in Fig. 1), to decrease the relative size of the light admitting aperture for filter 5 and cell 3 as compared with the light admitting aperture for filter 6 and cell 4, as described above. The relative light admitting apertures for the two photovoltaic cells are thus varied by rotation of mask 28 until the quantities of light received by the two cells are again equal. The two cells will then be equally energized and the galvanometer pointer 48 will return to its zero position. The amount of rotational displacement of mask 28 from its original intermediate position to this new position causes a corresponding movement of index mark 32 relative to scale 34, so as to give an indication on said scale of the increase in red content of the illumination, as represented in this case by a higher mired reading on said scale (indicative of a lower color temperature).

Conversely, if the color content of the incident light is preponderantly blue, corresponding to a color temperature above that represented by 170 mireds, a similar but reverse action will occur, causing the galvanometer pointer 48 to be deflected in the opposite direction, for example, toward the left as viewed by the user in Fig. 1, indicating preponderance of blue in the incident light. The rotatable collar C may then be rotated in the opposite direction to that described above (counter-clockwise as viewed in Fig. 2 and clockwise as viewed by the user in Fig. 1) to decrease the relative size of the light admitting aperture for filter 6 and cell 4 as compared with the light admitting aperture for filter 5 and cell 3, until the two cells are again equally illuminated and energized and the galvanometer pointer again returns to its zero position. The amount of rotative adjustment of collar C and mask 28 required to balance the illumination of the cells under these conditions will provide an indication of the increase in blue content of the light, as indicated by a lower value of the mired scale graduation in register with the index mark 32 (indicative of a higher color temperature).

In the above described device, the configuration of the leading edges 29a and 30a and trailing edges 29b and 30b of the adjustable mask 28 is such as to provide a certain predetermined relationship between the amount of angular movement of the mask and the resulting change in relative size of the light admitting apertures of the two cells as the mask is rotated in either direction from its intermediate position.

Figure 6:
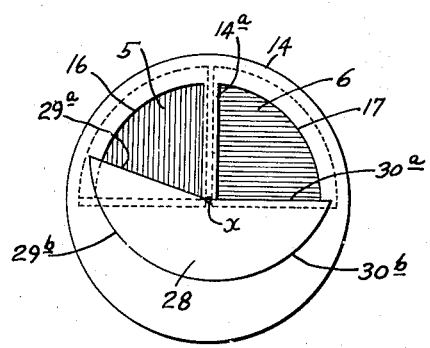
Figure 7:
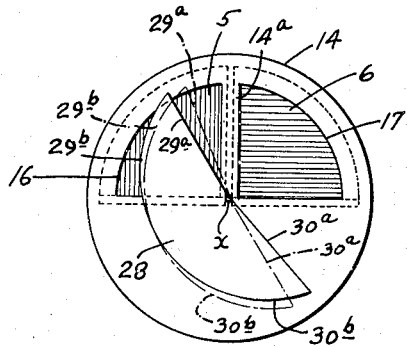

As has been described above, the movement of mask 28 from the intermediate position shown in Figs. 2 and 5 to the position shown in Fig. 6 decreases the light admitting aperture for cell 3 while simultaneously increasing the light admitting aperture for cell 4. It will be apparent, therefore, that during this initial portion of the movement of the mask away from the intermediate position, the rate of change in the relative size of the light admitting apertures for the two cells is the result of a simultaneous decrease in the aperture for one cell and increase in the aperture for the other cell. This results in a compression of this portion of the color temperature scale 34 due to the configuration of the leading edges of the mask.

Further rotation in the same direction from the position shown in Fig. 6 will decrease the light admitting aperture for cell 3, but since the aperture for cell 4 remains constant during such further rotation, the change in relative size of the two apertures will be less than would be the case if such further rotation resulted in a further simultaneous increase in the light admitting aperture for cell 4.

During this further rotation in the same direction to positions such as shown in Fig. 7, the rate of change in relative effective aperture sizes for the two cells is further modified by the configuration of the trailing edge 29b. As noted above, the opening up of the supplemental aperture at the trailing side of the mask causes the rate of decrease in the effective light admitting aperture for cell 3 to become progressively less as the rotation of the mask continues. This results in an advantageous spacing of the graduations in the outer portions of the color temperature scale, by providing a more nearly uniform spacing than would be the case if the light admitting aperture for cell 3 continued to decrease at a constant rate.

Figure 10:
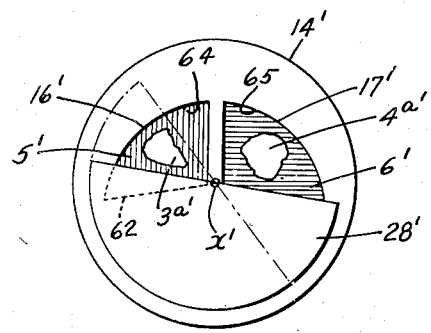
Fig. 10 is a schematic front elevation of certain elements of the device shown in Figs. 8 and 9, showing the adjustable light obstructing element in different positions.
Figures 8, 9:
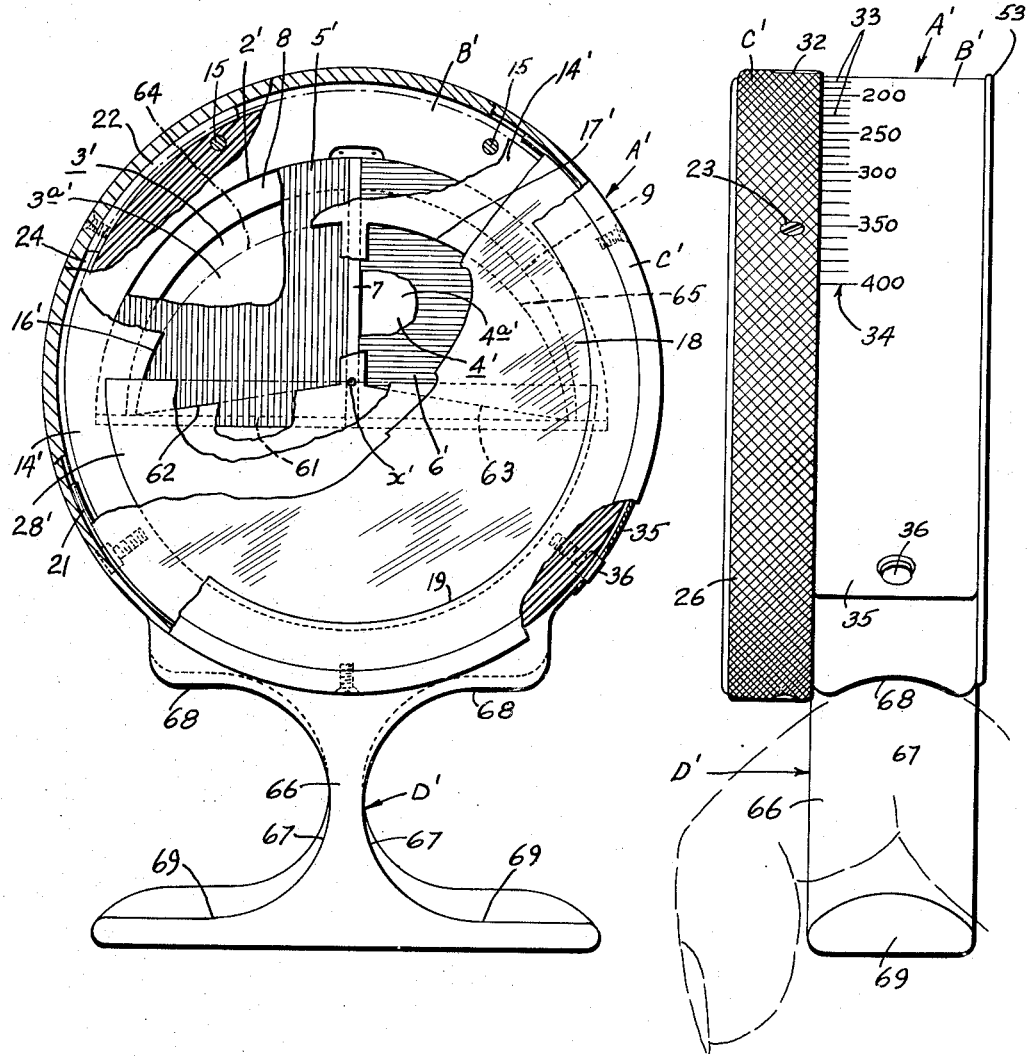
Fig. 8 is a view similar to Fig. 2, showing a modified form of device in accordance with the invention.
Fig. 9 is a side elevation of this modified device, taken from the right side in Fig. 8.

The form of device illustrated in Figs. 8, 9 and 10 is generally similar to that described above, but illustrates certain changes in the configuration and arrangement of the photovoltaic cells, color filters, and light obstructing means, and is also provided with a modified form of finger grip means.

In this case, the housing structure A' comprises a generally cylindrical casing member B' which is substantially the same as casing member B described above except that the internal recess 2' in the forward end thereof is of somewhat different shape as shown in Fig. 8, and a collar C' which is similar to the above described collar C and rotatably mounted on casing member B' in the same manner.

The photovoltaic cells 3' and 4' are of quadrantal shape, but the lower edges thereof as viewed in Fig. 8, extend somewhat below the axis X' of the housing structure, as indicated at 61. The color filters 5' and 6' are located in front of the light receiving surfaces 3a' and 4a' of the cells 3' and 4' respectively, and the positions thereof as viewed in Fig. 8 are modified to correspond with the modified positions of the cells. Said filters serve, as before, to restrict transmission of light to the respective cells to the portions of the spectrum transmitted by the respective filters. The characteristics and relative positions of the photovoltaic cells and color filters are otherwise the same as in the first described embodiment of the invention, and they may be similarly secured within the recess 2' of casing member B'.

A retaining plate 14' is provided as before, in front of the color filters and cells, and is provided with openings 16' and 17' through which light is admitted to the respective cells. The lower edges of the openings 16' and 17' are inclined downwardly at a small angle to the horizontal, such as about 5° to 10° from the axis X' to the outer edges of the openings (as indicated at 62 and 63. The upper edges 64 and 65 of the openings 16' and 17' are curved inwardly toward the axis X' from their outer ends toward their inner ends, as shown in Fig. 8, so that the radial distance thereof from the axis X' decreases progressively along each of these edges, from their outer ends to their inner ends. The adjustable light obstructing element in this form of the invention comprises a semi-circular opaque mask 28', whose upper edge when the mask is in the intermediate position shown extends diametrically through the axis X'. Said mask 28' may be secured to the inner face of the translucent light receiving and diffusing element 18 which is in turn secured to the rotatable collar C', all in the same manner as described above.

The construction of the device and the relative positions of the elements within the housing structure A' may be otherwise similar to the first described form of the invention, and it will be understood that the photovoltaic cells 3' and 4' are similarly connected to an electric circuit including an electrical indicating device such as a galvanometer, for indicating when the two cells are equally energized and also indicating when the energization of either cell exceeds that of the other cell. The casing member B' and rotatable operating member C' may also be similarly provided with cooperating scale and index means for indicating different values of the color content of light, and such means are again shown as including a mired scale 34 on casing member B'.

This form of device is also provided with finger grip means D' secured to and preferably formed integrally with the casing B' and extending downward therefrom rearwardly of the collar C'. I have shown a modified form of finger grip means having a central web 66 and formed to provide two laterally spaced finger receiving openings, which in this case are shown as open-sided notches or recesses 67 at the opposite sides of said web. The notches 67 are preferably of rounded configuration, and the grip means is shown as having upper and lower shoulder portions 68 and 69 extending outwardly from the central web 66 at the upper and lower ends thereof respectively. For facilitating gripping engagement and support by the fingers, the upper and lower shoulder members 68 and 69 may advantageously be curved upwardly at their central portions as viewed in Fig. 9.

The finger grip means may be gripped and held by the fingers of one hand in substantially the same manner as described above in connection with Fig. 1, with one finger engaged in each of the notches 67 to grip the central web therebetween, and with the collar C' disposed in position for operative engagement by the thumb in the same manner as before. It will be understood that either of the two forms of light meters described above may be provided with either of the two forms of finger grip means shown. In either case, the fingers may be extended through the finger holes 56 or the finger receiving notches 67, either in a direction from the front toward the rear thereof as shown in Fig. 1, or in a direction from the rear toward the front thereof as shown in Fig. 9. In the latter case, the back of the user's hand may be turned toward the user so that the rear end of the housing structure will be directed toward the user's eyes for observation of the galvanometer pointer and the front end directed toward the source or sources of incident light, and the operative engagement of the thumb with the rotatable collar C or C' will occur at the opposite side of the collar to that described in connection with Fig. 1.

The operation of this form of device for the measurement of changes in the relative color content of light is substantially the same as described above. In this case, the desired predetermined relationship between angular movement of the light obstructing mask and the resulting change in relative size of the light admitting apertures for the respective cells is obtained by the combined effect of the semi-circular mask 28' and the above described configuration of the openings 16' and 17' in plate 14'.

When the mask 28' is in the intermediate position shown in Fig. 8, the upper edge portion thereof projects above the inclined lower edges 62 and 63 of the openings 16' and 17', so as to obstruct transmission of light to the respective cells through a small sector of each of said openings. Thus, as before, the light admitting apertures of the two cells are of equal size, so that the cells are equally illuminated when exposed to light having an intermediate color temperature such as 170 mireds.

As the mask 28' is rotated either direction from this position, the first part of such movement will decrease the size of one of the light admitting apertures and increase the size of the other aperture. For example, rotation of the mask in a clockwise direction to the position indicated in full lines in Fig. 10 will simultaneously decrease the size of the light admitting aperture for the "red" cell 3' and increase the size of the aperture for the "blue" cell 4', resulting as before in a compression of this portion of the color temperature scale.

Further rotation in the same direction will decrease the light admitting aperture for cell 3' but the aperture for cell 4' will remain constant, so that the resulting change in relative size of the two apertures will again be less than it would if such further rotation also caused a continued increase in size of the light admitting aperture for cell 4'. During this further rotation in the same direction to a position such as shown for example in dot-dash lines in Fig. 10, the rate of change in relative aperture sizes for the two cells is further modified by the above described configuration of the upper edges 64 and 65 of openings 16' and 17'. Due to the progressive decrease in the radial distance of said edges from the axis X', the rate of decrease in size of the light admitting aperture for cell 3', for a given angular movement of the mask, becomes progressively less as the rotation continues, which again results in a more nearly uniform spacing of the color temperature scale graduations than would be the case if the light admitting aperture for cell 3' continued to decrease at a constant rate.

I claim:

1. In a light meter, the combination comprising: two photovoltaic cells having light receiving surfaces; a housing supporting said cells and provided with means for receiving incident light and transmitting it to the light receiving surfaces of said cells; an adjustable light obstructing element disposed forward of said cells and movable to different positions relative thereto to vary the relative quantities of light so transmitted to the light receiving surfaces of the respective cells; finger grip means secured to said housing and projecting therefrom, provided with two spaced openings adapted to receive two fingers of a user's hand and formed to provide firm gripping engagement of said grip means by said two fingers to support the meter in position for use; and an operating member movably mounted on said housing and operable to move said adjustable light obstructing element to said different positions, said operating member being disposed adjacent said finger grip means in position for operative engagement by the thumb of a user's hand when said meter is supported by gripping engagement of said finger grip means by the fingers of the same hand.

2. In a light meter, the combination comprising: two photovoltaic cells having light receiving surfaces; a housing supporting said cells and provided at its front end with means for receiving incident light and transmitting it to the light receiving surfaces of said cells; an adjustable light obstructing element disposed forward of said cells and movable to different positions relative thereto to vary the relative quantities of light so transmitted to the light receiving surfaces of the respective cells; finger grip means secured to and extending downward from said housing, provided with two spaced openings adapted to receive two fingers of a user's hand and formed to provide firm gripping engagement of said grip means by said two fingers to support the meter in position for use; and an operating member movably mounted on said housing and operable to move said adjustable light obstructing element to said different positions, said operating member being disposed adjacent and above said finger grip means in position for operative engagement by the thumb of a user's hand when said meter is supported in said position for use by gripping engagement of said finger grip means by the fingers of the same hand.

3. In a light meter, the combination comprising: two photovoltaic cells having light receiving surfaces; a housing supporting said cells and provided with means at its front end for receiving incident light and transmitting it to the light receiving surfaces of said cells, and having a viewing opening at its rear end; an adjustable light obstructing element disposed forward of said cells and movable to different positions relative thereto to vary the relative quantities of light so transmitted to the light receiving surfaces of the respective cells; electric circuit means within said housing connected to said photovoltaic cells and including an electrical indicating device having a movable pointer visible through said viewing opening for indicating variations in the relative energization of said cells by light transmitted to the light receiving surfaces thereof; finger grip means secured to and extending downward from said housing and formed for gripping engagement by the fingers of a hand to support the meter in position for use, with the rear end of the housing directed toward the user's eyes for observation of said movable pointer and with the front end of the housing directed away from the user for reception of incident light; and an operating member movably mounted on said housing and operable to move said adjustable light obstructing element to said different positions, said operating member being disposed adjacent and above said finger grip means in position for operative engagement by the thumb of a user's hand when said meter is supported in said position for use by gripping engagement of said finger grip means by the fingers of the same hand.

4. In a light meter, the combination as set forth in claim 3, in which said finger grip means is provided with two laterally spaced finger receiving openings and is formed to provide firm gripping engagement of said grip means by two fingers of a user's hand disposed within the respective openings.

5. In a light meter, the combination comprising: two photovoltaic cells having light receiving surfaces; a cylindrical housing enclosing and supporting said cells and provided with means at its front end for receiving incident light and transmitting it to the light receiving surfaces of said cells, and having a viewing opening at its rear end; an annular collar rotatably mounted on said housing at the front end thereof for rotation about the axis of the housing; an adjustable light obstructing element disposed forward of said cells and secured to said collar for rotation therewith to different positions relative to said cells to vary the relative quantities of light so transmitted to the light receiving surfaces of the respective cells; electric circuit means within said housing connected to said photovoltaic cells and including an electrical indicating device having a movable pointer visible through said viewing opening for indicating variations in the relative energization of said cells by light transmitted to the light receiving surfaces thereof; finger grip means secured to and extending downward from said housing and formed for gripping engagement by the fingers of a hand to support the meter in position for use, with the rear end of the housing directed toward the user's eyes for observation of said movable pointer and with the front end of the housing directed away from the user for reception of incident light; scale means on the peripheral surface of said housing comprising a plurality of angularly spaced graduations located adjacent said collar; said collar being provided with an index mark positioned to register with the graduations of said scale means and being disposed adjacent and above said finger grip means in position for operative engagement by the thumb of a user's hand when said meter is supported in said position for use by gripping engagement of said finger grip means by the fingers of the same hand.

References Cited in the file of this patent

UNITED STATES PATENTS

| Number | Name | Date |
|---|---|---|
| 2,178,197 | Bing | Oct. 31, 1939 |
| 2,249,833 | James | July 22, 1941 |
| 2,302,554 | Kingsbury | Nov. 17, 1942 |
| 2,579,347 | Taylor | Dec. 18, 1951 |
| 2,587,601 | Crandell et al. | Mar. 4, 1952 |

FOREIGN PATENTS

| Number | Country | Date |
|---|---|---|
| 508,802 | Germany | July 5, 1939 |
| 925,985 | France | Apr. 14, 1947 |

OTHER REFERENCES

Journal of Scientific Instruments, vol. 6, December 1929, pages 374 through 379. Publ. Cambridge University Press, London, England.

American Cinematographer, August 1948, pages 267 through 281.